Patented Feb. 24, 1953

2,629,742

UNITED STATES PATENT OFFICE 2,629,742

ORGANIC SULFIDE COMPOSITIONS AND METHOD OF MAKING AND USING

Everett E. Gilbert, New York, N. Y., assignor to Allied Chemical & Dye Corporation, a corporation of New York No Drawing. Application October 29, 1946, Serial No. 706,503

3 Claims. (Cl. 260—608)

This invention relates to novel methods for making phenyl hydrosulfide (thiophenol) and diphenyl disulfide and particularly to methods of making diphenyl polysulfide intermediates especially adapted for use in making such compounds.

In the past it has been proposed to prepare thiophenol by reduction of diphenyl disulfide. Its formation by reduction of the trisulfide also has been mentioned. However, as far as I am aware no one has ever developed a practical method for the manufacture of thiophenol via these procedures.

In the past it also has been proposed to react sulfur with diphenyl sulfone in equimolecular proportions to form diphenyl sulfide mixed with diphenyl disulfide formed as a by-product. By reduction, this product is capable of producing a minor proportion of thiophenol, in the neighborhood of 15%. By vacuum distillation, on the other hand, it yields correspondingly small quantities of diphenyl disulfide, around 17%.

An object of the present invention is to provide a method for obtaining thiophenol in high yields. A further object is to obtain thiophenol from diphenyl sulfone. A further object is to provide a process suitable for the production of polysulfide mixtures useful as cutting oils, insecticides and additives for improving the lubricating effect of hydrocarbon lubricating oils. A still further object is to provide a method for obtaining diphenyl disulfide from diphenyl sulfone in high yields. Further objects will be apparent from the following general description of the invention and detailed examples illustrating its application.

In accordance with the present invention, polysulfide mixtures suitable for reduction to thiophenol in high yields are obtainable by heating diphenyl sulfone with sulfur in a ratio of at least three atomic equivalents of sulfur per mol of diphenyl sulfone at a temperature sufficient to expel sulfur dioxide and form diphenyl polysulfides. The polysulfide products obtained by this process comprise small proportions of diphenyl monosulfide and thiophenol and small proportions of other sulfur-containing by-products mixed with relatively large proportions of diphenyl polysulfides of the general formula $(C_6H_5)_2S_x$ wherein $x$ has the value 4, 5, or 6. The polysulfides are soluble in benzene, petroleum ether, and the like.

It is preferred to employ between 3 and 6 atomic equivalents of sulfur for each mol of diphenyl sulfone and to carry out the reaction at a temperature between 290° C. and 350° C. Within this temperature range the most suitable temperature for carrying out the reaction will vary with the ratio of sulfur to diphenyl sulfone employed.

While ratios of sulfur to sulfone higher than 6:1 may be employed in effecting the reaction, the excess sulfur normally remains at least partly in free form. When the product is converted to thiophenol by reduction, the excess sulfur may oxidize the reducing agent and consequently may require more reducing agent than necessary when excess sulfur is avoided. The excess sulfur in the products prepared with high molecular proportions of sulfur may be consumed, however, by adding diphenyl sulfone and causing the diphenyl sulfone to react with the excess sulfur. Even sulfur present in combined form as a higher polysulfide may be reacted with diphenyl sulfone to produce a diphenyl polysulfide of lower sulfur content. Thus the higher diphenyl polysulfides, as well as free sulfur, are capable of converting diphenyl sulfone to diphenyl polysulfide under the same conditions of temperature required for the sulfur reaction.

The polysulfides of the invention are readily converted to thiophenol by conventional reduction methods, for instance, reduction by metallic iron and sulfuric acid solutions or by metallic zinc and acid or alkaline solutions, or electrolytic reduction. If desired, any thiophenol and diphenyl monosulfide present in the polysulfide product may be separated by vacuum distillation prior to reduction of the polysulfides. However, it is usually more expedient to reduce first and separate monosulfide from the total thiophenol product.

A preferred reducing agent is metallic iron in the presence of a fraction of its weight of aqueous sulfuric acid. The metallic iron reacts with sulfur of the polysulfides to form ferrous sulfide. When larger proportions of acid are employed, the ferrous sulfide is decomposed to form hydrogen sulfide and ferrous sulfate. Normally it is preferred to avoid an excess of the sulfuric acid so that no substantial quantity of hydrogen sulfide will be liberated. Though not necessary, it is convenient to remove the thiophenol by distillation during the reduction process.

I have found that suitable polysulfide mixtures containing polysulfides with sulfur contents of 4, 5 and 6 atoms of sulfur per molecule may be prepared not only in the manner described above but also by reaction of diphenyl monosulfide with sulfur in the appropriate proportions. Thus, by heating diphenyl monosulfide with sulfur in a ratio of 3 atomic equivalents of sulfur per mol of diphenyl monosulfide, a polysulfide product of the average molecular formula $(C_6H_5)_2S_4$ is obtained which upon reduction by the methods described above has yielded thiophenol in approximately 60% of theoretical yield, and by using 5 atomic equivalents of sulfur a polysulfide product of the average molecular formula $(C_6H_5)_2S_6$ is obtained which has yielded thiophenol in approximately 65% of theoretical yield. Working within these limits, substantially higher yields of thiophenol, between 70% and 80%, have been obtained.

The advantage of employing these higher polysulfides is illustrated by comparison with a similar reduction of a $(C_6H_5)_2S_2$ product obtained by heating the monosulfide with one atom equivalent of sulfur, by which a thiophenol yield of only 43% of theoretical was obtained.

The diphenyl polysulfides described may be converted to diphenyl disulfide by simple distillation at reduced pressure, for example at an absolute pressure of 2 to 100 mm. of mercury. When this distillation is carried out, polysulfides are decomposed into diphenyl disulfide, which distills out, and free sulfur which remains as distillation residue. Monosulfide and thiophenol distill in the forerunnings. The polysulfides, like the disulfides, are converted to diphenyl monosulfide by prolonged retention at elevated temperatures. While the decomposition of the polysulfides to the disulfide may be effected by distillation at pressures above 100 mm. of mercury, increasing proportions of the product are converted to the monosulfide as the distillation temperature is raised; distillation at atmospheric pressure yields very little of the diphenyl disulfide, most of the product being converted to the monosulfide.

The following examples illustrate the practice of the invention. In the examples, the polysulfide products, for purposes of calculating yields, have been treated as homogeneous polysulfide plus monosulfide. It should be recognized, however, that the products are mixtures of diphenyl polysulfides containing 4, 5 and 6 atoms of sulfur and possibly higher and lower polysulfides as well. For instance, in Example 1, a sulfur ratio of 3.3 atoms per molecule of diphenyl sulfone is employed but reliable data indicate that about one-fourth of the phenyl radicals are bound as mono-sulfide so that the remaining sulfur and phenyl radicals are present in a ratio corresponding to the average formula $Ph_2S_{4.1}$, and the product is thus largely $Ph_2S_4$ containing considerable proportions of $Ph_2S_3$ and $Ph_2S_5$ and smaller proportions of $Ph_2S_6$ and $Ph_2S_2$. Similarly, the polysulfide mixture of Example 2 has the average formula $Ph_2S_{5.2}$ and thus comprises mainly the compounds $Ph_2S_4$, $Ph_2S_5$, and $Ph_2S_6$.

The polysulfide mixtures containing these compounds constitute novel products which possess utility not only as intermediates in the manufacture of thiophenol and diphenyl disulfide but also as cutting oils, insecticides, hydrocarbon lubricant additives, and as compositions useful in many other ways. The minor proportions of non-polysulfide materials present in the polysulfide products have been neglected in calculating yields, but their presence is reflected in the yield data. Thus, while any thiophenol present is recovered as such in the reduction of the polysulfide products, it is not recovered as disulfide in the vacuum distillation. Other by-products, on the other hand, are not converted to disulfide by the distillation nor to thiophenol by reduction, and hence the presence of such by-products explains, at least in large measure, the less-than-theoretical yields of the desired products.

EXAMPLE 1

One mol of diphenyl sulfone is heated with 3.3 atomic equivalents of sulfur at a temperature of about 330° C. for about 30 minutes under reflux. At the end of this period, evolution of sulfur dioxide is complete. The product is a red oil containing a minor proportion (19 to 26 mol percent) of diphenyl monosulfide, and the remainder diphenyl polysulfides and a minor proportion of sulfur-containing by-products.

EXAMPLE 2

One mol of diphenyl sulfone is heated for 70 minutes at 320° C. with 4.5 atomic equivalents of sulfur. The reaction mass is agitated under reflux during the reaction period. The product is a red oil containing 16 to 17 mol percent of diphenyl monosulfide, and the remainder diphenyl polysulfides and a minor proportion of sulfur-containing by-products.

EXAMPLE 3

The process of the preceding example is repeated using a heating period of 35 minutes. In this case the product contains only about 8½ mol percent monosulfide and the balance consists of diphenyl polysulfides and sulfur-containing by-products. A comparison of the monosulfide contents of this product and the product of Example 2 illustrates the effect of heat in decomposing the polysulfides to the monosulfides and shows the desirability of avoiding maintenance of elevated temperatures for excessive periods.

EXAMPLE 4

One mol of diphenyl sulfone is heated as in the preceding example with 6 atomic equivalents of sulfur at a temperature of about 335° C. for 50 minutes. The product, which is a red oil, contains between 10 and 15 mol percent diphenyl monosulfide and the remainder thiophenol, polysulfides and impurities.

EXAMPLE 5

Products of Examples 1, 2 and 4 are distilled in a still provided with a rectifying column at a pressure of approximately 2½ mm. of mercury absolute. Temperatures are determined in the still and in the head of the column. Diphenyl monosulfide is distilled at a still temperature of 190° to 200° C. and a head temperature of 105° to 115° C. The disulfide comes off mainly at still and head temperatures of 200° to 240° C. and 115° to 150° C., respectively. For example, from 119 parts of a 115° to 150° C. distillate fraction of product from a polysulfide prepared as described in Example 2, recrystallization from low boiling petroleum ether yields 103 parts of diphenyl disulfide of 53° to 56° C. melting point. The molal proportions of diphenyl disulfide distillate recovered (based on the distilland) are as follows:

*Table 1*

| Example | Sulfur Ratio | $Ph_2S_2$ Percent |
|---|---|---|
| 1 | 3.3 | 60 |
| 2 | 4.5 | 72 |
| 4 | 6 | 64 |

EXAMPLE 6

250 parts of a polysulfide ($Ph_2S_{3.3}$) product prepared from diphenyl sulfone as described in Example 1 without separation of monosulfide, 250 parts of iron filings and 2200 parts of aqueous 25% $H_2SO_4$ solution are heated with mechanical agitation in a still for about one-half hour gradually increasing the temperature from 40° to 100° C. Steam is then introduced to steam-distill thiophenol which is collected in a condenser. 128 parts of thiophenol, which separates as an oily layer from the aqueous condensate, is recovered, corresponding to a yield of about 58% based on sulfone or about 77% based on polysulfide.

EXAMPLE 7

The process of the preceding example is repeated employing polysulfide products ($Ph_2S_{4.5}$) obtained as described in Examples 2 and 3. Yields based on sulfone are, respectively, 60% and 66%, corresponding to yields of about 73% based on polysulfide.

EXAMPLE 8

The process of Example 6 is repeated employing a polysulfide product ($Ph_2S_6$) obtained as described in Example 4. Yields based on sulfone and polysulfide are 58% and 65%.

The yield data of Examples 1 to 8 are presented below in tabular form for easy comparison:

*Table 2*

| Example | Sulfur Ratio | | Percent $Ph_2S$ | Percent $Ph_2S_2$ | Percent PhSH | |
|---|---|---|---|---|---|---|
| | Used | in $Ph_2S_x$ | | | on Sulfone | on Polysulfide |
| 1 | 3.3 | 4.1 | 19–26 | 60 | 58 | 77 |
| 2 | 4.5 | 5.2 | 16–17 | 72 | 60 | 73 |
| 3 | 4.5 | 4.8 | 8–9 | | 66 | 73 |
| 4 | 6.0 | 6.6 | 10–15 | 64 | 58 | 65 |

From the tabulated figures it is apparent that a maximum yield of the disulfide and a minimum yield of sulfur-containing organic impurities are obtained when a sulfur ratio of approximately 4½ atomic equivalents of sulfur per mol of sulfone is employed. Below this ratio and above this ratio the proportion of sulfur-containing impurities increases. The proportion of the monosulfide, on the other hand, decreases gradually as the sulfur ratio increases, although not in direct linear proportion; and the combined yield of monosulfide plus thiophenol attains a maximum with a sulfur ratio between 3 and 4. However, the best thiophenol yields are obtained from the polysulfide mixtures comprising mainly the pentasulfide.

EXAMPLE 9

104 grams of a product prepared as in Example 1 is mixed with 200 grams of metallic zinc dust, one liter of isopropanol and 50 ml. of benzene in a glass flask. The solution is heated to about 80° C. and stirred mechanically while 700 ml. of 36% hydrochloric acid is added gradually. Hydrogen sulfide is evolved from the mixture as the hydrochloric acid is added. When all of the acid has been added and the hydrogen sulfide no longer evolves from the mixture, the mixture is poured into cold water (1000 ml.). The resulting solution is extracted with 500 ml. of benzene. The benzene solution is fractionally distilled yielding 53 grams of thiophenol (60% of theoretical yield) as distillation residue.

EXAMPLE 10

294 grams of diphenyl polysulfide product ($Ph_2S_{4.5}$) obtained as described in Example 2 is mixed with 294 grams of iron filings. The mixture is heated and agitated at 100° C. for an hour while steam, at gradually rising temperature from 105° to 130° C., is introduced slowly and about 18 ml. of aqueous 50% $H_2SO_4$ is added drop by drop. During this period the mixture is allowed to distill and distillate is condensed. In the next 5½ hours the process is continued, sulfuric acid being added more slowly so that approximately 17 ml. of aqueous 50% $H_2SO_4$ is added in this period. Meanwhile a total of 2400 ml. of distillate comprising 135 ml. of organic oil is recovered as condensate. The reaction temperature is then raised slowly to 225° C. in 7 hours, the steam temperature being raised during the same period to 260° C. An additional 30 ml. of organic oil is recovered. From the combined organic layers, 133 grams of thiophenol and 31 grams of diphenyl monosulfide are recovered representing a thiophenol yield of 61% based on sulfone or 68% based on polysulfides. During the reaction very little hydrogen or hydrogen sulfide is evolved and the iron is recovered largely in the form of pyrophoric iron sulfide.

EXAMPLE 11

Two mols of diphenyl monosulfide and 6 atomic equivalents of sulfur are heated for 1¼ hours at reflux temperature. During the heating period the temperature rises from an initial 305° C. to a final 330° C. Unreacted diphenyl monosulfide is distilled off from the product at 3 to 5 mm. mercury, absolute pressure, and a maximum distillation temperature of 150° C. Approximately 0.4 mol of the monosulfide is recovered in the distillate. Upon reduction of the polysulfide distillation residue ($Ph_2S_{4!}$), 1.2 mols of thiophenol is obtained amounting approximately to a 60% yield, based on the total diphenyl monosulfide used.

It was noted above that diphenyl monosulfide can be converted to polysulfide by heating with sulfur. This property makes it possible, by returning monosulfide recovered from polysulfides or their reduction products to the sulfurization step, to convert the monosulfide by-product completely to the desired polysulfides or thiophenol.

I claim:

1. The method of making a diphenyl polysulfide suitable for production of thiophenol and diphenyl disulfide, which comprises heating diphenyl sulfone with at least three atomic equivalents of sulfur per mol of sulfone.

2. The method of making a diphenyl polysulfide suitable for production of thiophenol and diphenyl disulfide, which comprises heating diphenyl sulfone with between 3 and 6, inclusive, atomic equivalents of sulfur per mol of sulfone at a temperature between 290° and 350° C.

3. The method of making a diphenyl polysulfide composition having an average molecular formula $(C_6H_5)_2S_x$ wherein $x$ has any value between 4 and 6, inclusive, and containing principally diphenyl polysulfides with 4, 5 and 6 sulfur atoms in the molecule, which comprises heating diphenyl sulfone with between 3 and 6, inclusive, atomic equivalents of sulfur per mol of sulfone at a temperature between 290° C. and 350° C.

EVERETT E. GILBERT.

REFERENCES CITED

The following references are of record in the file of this patent:

UNITED STATES PATENTS

| Number | Name | Date |
|---|---|---|
| 2,237,627 | Olin | Apr. 8, 1941 |
| 2,388,047 | Evans et al. | Oct. 30, 1945 |
| 2,402,685 | Signaigo | June 25, 1946 |
| 2,402,686 | Signaigo | June 25, 1946 |
| 2,456,500 | Gilbert et al. | Dec. 14, 1948 |
| 2,506,416 | Gilbert et al. | May 2, 1950 |